United States Patent
Zenner et al.

(10) Patent No.: US 10,293,698 B2
(45) Date of Patent: May 21, 2019

(54) SYSTEM AND METHOD FOR POWERING ELECTRIFIED VEHICLE WITH MODULAR BATTERY

(71) Applicant: FORD GLOBAL TECHNOLOGIES, LLC, Dearborn, MI (US)

(72) Inventors: Thomas Zenner, Dueren (DE); Mazen Hammoud, Dearborn, MI (US); Steve F. Chorian, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 14/822,262

(22) Filed: Aug. 10, 2015

(65) Prior Publication Data
US 2017/0043670 A1 Feb. 16, 2017

(51) Int. Cl.
*B60L 53/20* (2019.01)
*B60L 11/18* (2006.01)
*B60L 53/14* (2019.01)
*B60L 53/80* (2019.01)
*B60L 58/12* (2019.01)
*B60L 58/20* (2019.01)

(52) U.S. Cl.
CPC ........... *B60L 11/1822* (2013.01); *B60L 53/14* (2019.02); *B60L 53/20* (2019.02); *B60L 53/80* (2019.02); *B60L 58/12* (2019.02); *B60L 58/20* (2019.02); *B60L 2270/40* (2013.01); *Y02T 10/7005* (2013.01); *Y02T 10/7044* (2013.01); *Y02T 10/7066* (2013.01); *Y02T 10/7072* (2013.01); *Y02T 90/124* (2013.01); *Y02T 90/127* (2013.01); *Y02T 90/14* (2013.01); *Y02T 90/168* (2013.01); *Y04S 30/12* (2013.01)

(58) Field of Classification Search
CPC .................................................... B60L 11/1822
See application file for complete search history.

(56) References Cited

U.S. PATENT DOCUMENTS 5,160,879 A * 11/1992 Tortola ................. H01M 2/105
320/111
5,928,020 A * 7/1999 Bishop, Jr. ............ H02J 7/0045
200/51.09

(Continued)

FOREIGN PATENT DOCUMENTS

| GB | 2481806 A | 1/2012 | |
|---|---|---|---|
| JP | 2011079510 A | 4/2011 | |
| WO | WO 2015/067456 | * 5/2015 | .............. B60L 11/18 |

OTHER PUBLICATIONS

WO 2015/067456 Schmitz, Energy storage system for electrically driven vehicle, May 2015 Translation.*

(Continued)

*Primary Examiner* — Drew A Dunn
*Assistant Examiner* — Tynese V McDaniel
(74) *Attorney, Agent, or Firm* — Carlson, Gaskey & Olds, P.C.

(57) ABSTRACT

An exemplary aspect of the present disclosure relates to an electrified vehicle including, among other things, a vehicle-mounted battery and a modular battery. The modular battery is selectively removable from the vehicle, and is configured to be charged at a location remote from the vehicle. The vehicle is selectively powered by at least one of the modular battery and the vehicle-mounted battery.

16 Claims, 10 Drawing Sheets

(56) References Cited

U.S. PATENT DOCUMENTS

| | | | | |
|---|---|---|---|---|
| 6,172,478 | B1* | 1/2001 | Leppo | G06F 1/263 |
| | | | | 320/116 |
| 6,384,573 | B1* | 5/2002 | Dunn | F02N 11/0866 |
| | | | | 320/104 |
| 8,146,694 | B2 | 4/2012 | Hamidi | |
| 8,710,795 | B2 | 4/2014 | Scheucher | |
| 8,907,629 | B2* | 12/2014 | Kelty | B60L 11/187 |
| | | | | 320/132 |
| 2001/0013437 | A1* | 8/2001 | Husted | A61G 5/1089 |
| | | | | 180/65.1 |
| 2001/0015635 | A1* | 8/2001 | Leppo | G06F 1/263 |
| | | | | 320/116 |
| 2007/0107963 | A1* | 5/2007 | Chiu | H01M 2/1005 |
| | | | | 180/68.5 |
| 2013/0164580 | A1* | 6/2013 | Au | H02J 7/0045 |
| | | | | 429/83 |
| 2013/0200846 | A1* | 8/2013 | Ang | B60L 11/1816 |
| | | | | 320/109 |
| 2014/0292235 | A1* | 10/2014 | Murase | B60L 11/1868 |
| | | | | 318/139 |
| 2014/0375272 | A1* | 12/2014 | Johnsen | B60L 53/14 |
| | | | | 320/136 |
| 2015/0280467 | A1* | 10/2015 | Matsuda | B60L 53/80 |
| | | | | 307/10.1 |
| 2016/0039300 | A1* | 2/2016 | Wang | B60L 11/1822 |
| | | | | 244/39 |
| 2016/0243961 | A1* | 8/2016 | Schmitz | B60L 11/1803 |

OTHER PUBLICATIONS

Giurca, "Portable Electric Unit—PEU for cheap electric vehicle".
HybridCars.com, "Battery swapping station for electric bikes and scooters".
TreeHugger.com, "MIRA 'Plugless' Plug-In Hybrid Car Has Removable Battery Packs".

* cited by examiner

FIG.6
CONTACTOR OPEN AND
CONTACTS RETRACTED

FIG.7
CONTACTOR CLOSED AND
CONTACTS EXTENDED

SYSTEM AND METHOD FOR POWERING ELECTRIFIED VEHICLE WITH MODULAR BATTERY

BACKGROUND

This disclosure relates to a system and method for powering an electrified vehicle using a modular battery.

Electrified vehicles, such as hybrid electric vehicles (HEVs), combine a conventional internal combustion engine (ICE) propulsion system with an electric propulsion system, including a vehicle-mounted battery. The vehicle-mounted battery includes a plurality of battery cells providing power to a motor, which is configured to drive the vehicle.

Typically, the vehicle-mounted battery is not designed to be routinely removed from the vehicle for charging. Instead, the vehicle-mounted battery is designed to be connected to the vehicle for substantially the entire life of the battery (with the exception of maintenance). The vehicle-mounted battery is charged without being removed from the vehicle, using techniques such as regenerative braking. In some other vehicles, such as plug-in hybrid electric vehicles, the vehicle-mounted battery is charged from an external power source. Still, the vehicle-mounted battery remains mounted to the vehicle during charging.

Some known vehicles include vehicle-mounted batteries having a plurality of cells configured to be removed from the vehicle-mounted battery for charging. In other known electric vehicles, such as bicycles, the vehicle is powered using a single, rechargeable battery pack. In those examples, the battery pack is the sole power source for the vehicle.

SUMMARY

An exemplary aspect of the present disclosure relates to an electrified vehicle including, among other things, a vehicle-mounted battery and a modular battery. The modular battery is selectively removable from the vehicle, and is configured to be charged at a location remote from the vehicle. The vehicle is selectively powered by at least one of the modular battery and the vehicle-mounted battery.

In a further non-limiting embodiment of the foregoing vehicle, the modular battery provides a lower voltage than the vehicle-mounted battery.

In a further non-limiting embodiment of the foregoing vehicle, a DC-to-DC converter is provided between the modular battery and an electric machine, the DC-to-DC converter configured to increase the voltage provided by the modular battery and supply the increased voltage to the electric machine.

In a further non-limiting embodiment of the foregoing vehicle, the modular battery is connected to an electric machine by way of a contactor. The contactor is separate from the modular battery.

In a further non-limiting embodiment of the foregoing vehicle, the modular battery provides a voltage of about 60 Volts DC.

In a further non-limiting embodiment of the foregoing vehicle, the modular battery provides a voltage substantially equal to a voltage provided by the vehicle-mounted battery.

In a further non-limiting embodiment of the foregoing vehicle, the modular battery includes a contactor.

In a further non-limiting embodiment of the foregoing vehicle, the modular battery further includes a plurality of retractable contacts. The contacts are configured to selectively (1) project from an exterior of the modular battery when the contactor is closed, and (2) retract into the interior of the modular battery when the contactor is open.

In a further non-limiting embodiment of the foregoing vehicle, the modular battery provides a voltage within a range of 250-1,000 Volts DC.

In a further non-limiting embodiment of the foregoing vehicle, the modular battery weighs about 5 kilograms.

In a further non-limiting embodiment of the foregoing vehicle, the vehicle is powered by only the modular battery until the charge of the modular battery reaches a minimum state of charge threshold. Further, the vehicle is powered by only the vehicle-mounted battery when the charge of the modular battery reaches minimum state of charge threshold.

In a further non-limiting embodiment of the foregoing vehicle, the minimum state of charge threshold is 15%.

In a further non-limiting embodiment of the foregoing vehicle, the vehicle is powered by both the modular battery and the vehicle-mounted battery until the charge of the modular battery reaches a minimum state of charge threshold. Further, the vehicle is powered by only the vehicle-mounted battery when the charge of the modular battery reaches the minimum state of charge threshold.

In a further non-limiting embodiment of the foregoing vehicle, the modular battery includes at least one strap to allow a user to transport the modular battery.

In a further non-limiting embodiment of the foregoing vehicle, the modular battery and the vehicle-mounted battery are connected to an electric machine in parallel with one another, the electric machine configured to drive wheels of the vehicle.

A method according to an exemplary aspect of the present disclosure includes, among other things, powering a vehicle by selectively drawing power from at least one of a vehicle-mounted battery and a modular battery. The modular battery is configured to be charged at a location remote from the vehicle.

In a further non-limiting embodiment of the foregoing method, the vehicle is powered by only the modular battery until the charge of the modular battery reaches a minimum state of charge threshold, and the vehicle is powered by only the vehicle-mounted battery when the charge of the modular battery reaches the minimum state of charge threshold.

In a further non-limiting embodiment of the foregoing method, the vehicle is powered by both the modular battery and the vehicle-mounted battery until the charge of the modular battery reaches a minimum state of charge threshold, and the vehicle is powered by only the vehicle-mounted battery when the charge of the modular battery reaches the minimum state of charge threshold.

In a further non-limiting embodiment of the foregoing method, contacts of the modular battery are retracted within an exterior housing of the modular battery when a contactor of the modular battery is open, and contacts of the modular battery are projected outside the exterior housing when the contactor is closed.

In a further non-limiting embodiment of the foregoing method, the modular battery is charged at a location remote from the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

In FIG. 2, the modular battery is a relatively low voltage battery.

FIG. 4 schematically illustrates a second example connection between a second example modular battery, the vehicle-mounted battery, and the motor. In FIG. 4, the modular battery is a relatively high voltage battery.

FIG. 6 schematically illustrates example retractable contacts. In FIG. 6, the contacts are retracted into an interior of a modular battery.

FIG. 7 schematically illustrates example retractable contacts. In FIG. 7, the contacts project from an exterior of the modular battery.

DETAILED DESCRIPTION

This disclosure relates to a system and method for powering an electrified vehicle using a modular battery. The modular battery is designed to be removed from the vehicle and charged on an electrical grid, such as at a user's home or office, and extends vehicle range by reducing reliance on other power sources including vehicle-mounted batteries and/or an internal combustion engine.

Figure 1:
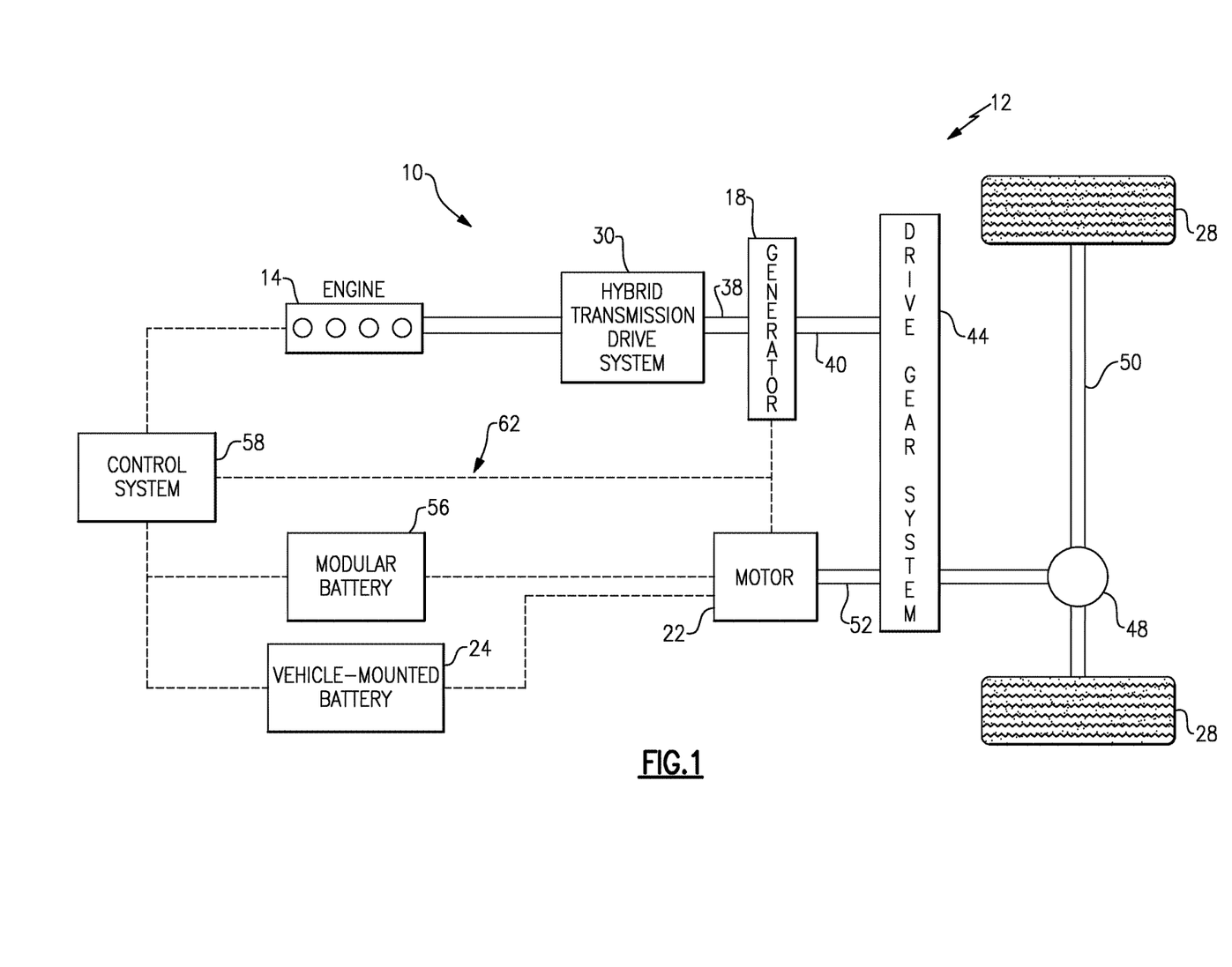
FIG. 1 schematically illustrates a powertrain of a vehicle.

FIG. 1 schematically illustrates a powertrain of a vehicle 12, which, in this example, is an electrified vehicle. Although depicted as a hybrid electric vehicle (HEV), it should be understood that the concepts described herein are not limited to HEVs and could extend to other vehicles, including, but not limited to, plug-in hybrid electric vehicles (PHEVs), battery electric vehicles (BEVs), and modular hybrid transmission vehicles.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, a vehicle-mounted battery 24, and a modular battery 56 (described in detail below). In this embodiment, the second drive system is considered an electric drive system of the powertrain 10. The first and second drive systems generate torque to drive one or more sets of vehicle drive wheels 28 of the vehicle 12.

The engine 14 and the generator 18 may be connected through a power transfer unit 30, which in this example is a hybrid transmission gear system, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44, which in this example is a drive gear system. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the vehicle-mounted battery 24.

The vehicle-mounted battery 24 is one exemplary type of an electrified vehicle battery assembly and may take the form of a high voltage battery that is capable of outputting electrical power to operate the motor 22, the generator 18, and/or other electrical loads. Other types of energy storage devices and/or output devices, such as the modular battery 56, can also be used to supply power to the motor 22 and elsewhere within the vehicle 12.

The vehicle-mounted battery 24 is designed to be fixed to the vehicle 12 for the life of the vehicle-mounted battery 24. The vehicle-mounted battery 24 may include a plurality of battery cells which are charged using the architecture associated with the powertrain 10. For instance, the cells of the vehicle-mounted battery 24 may be charged using techniques such as regenerative braking. The cells of the vehicle-mounted battery are not designed to be routinely removed from the vehicle for charging. The individual cells and/or the entire vehicle-mounted battery itself may be removed in relatively rare instances, such as if maintenance or replacement is required.

As mentioned, the vehicle 12 includes a modular battery 56. The modular battery 56 may be a single cell battery or include multiple cells. In this example, the modular battery 56 is connected to the motor 22 in parallel to the vehicle-mounted battery 24. Unlike the vehicle-mounted battery 24, the modular battery 56 is designed to be routinely removed from the vehicle 12 and charged at a location remote from the vehicle 12. For instance, the modular battery 56 can be charged on an electrical grid, such as at a user's home or office.

The powertrain 10 may additionally include a control system 58 (or, "controller") for monitoring and/or controlling various aspects of the vehicle 12. For example, the control system 58 may communicate with the electric drive system, the power transfer units 30, 44, and other components to monitor the vehicle 12, control the vehicle 12, or both.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices. A controller area network (CAN) 62 allows the control system 58 to communicate with the various component of the vehicle 12.

Figure 2:
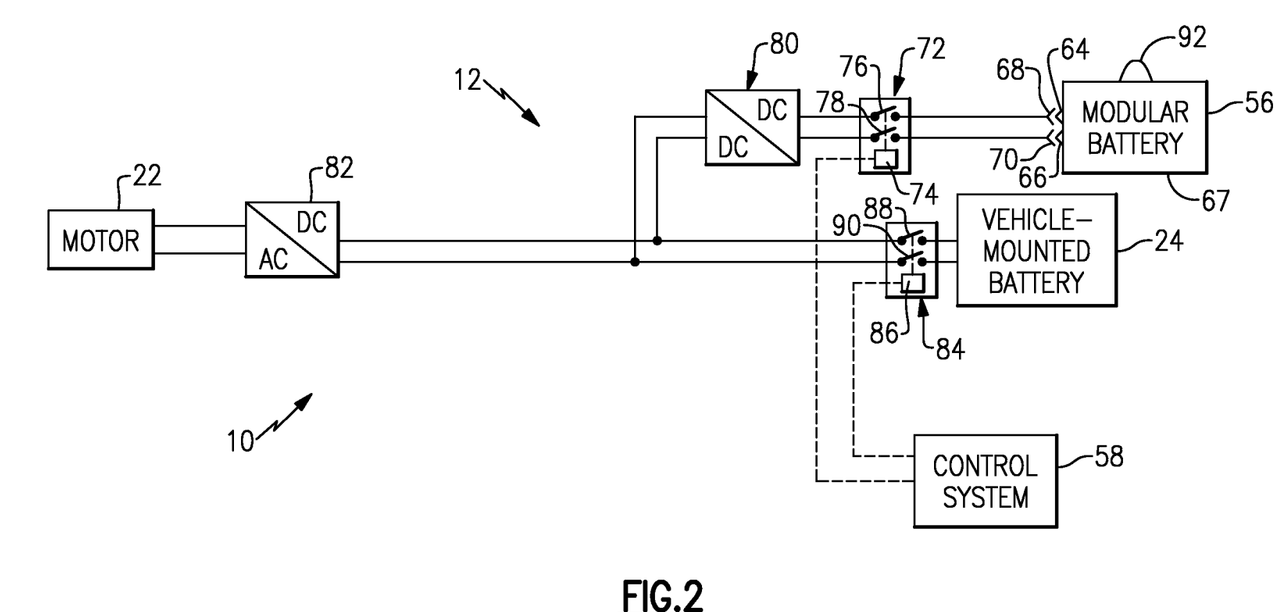
FIG. 2 schematically illustrates a first example connection between a first example modular battery, the vehicle-mounted battery, and the motor.

FIG. 2 schematically illustrates a portion of the powertrain 10. In particular, FIG. 2 illustrates a first example connection between the modular battery 56, the vehicle-mounted battery 24, and the motor 22. In the FIG. 2 example, the modular battery 56 is a relatively low voltage battery. In one non-limiting example, the voltage of the modular battery 56 is about 60 Volts (DC). In one particular example, the voltage of the modular battery 56 is below 60 Volts (DC). The modular battery 56 could provide different voltage levels, as discussed below relative to FIG. 4, for example.

The modular battery 56 includes a first contact 64 and a second contact 66 for connection to first and second connectors 68, 70 mounted to the vehicle 12. In this example, the first contact 64 has a positive polarity and the second contact 66 has a negative polarity. The first and second contacts 64, 66 are metallic posts in one example, and project from an exterior housing 67 of the modular battery 56. The first and second connectors 68, 70 are sockets receiving the metallic posts. Other types of connectors 68, 70 and contacts 64, 66 come within the scope of this disclosure. The contacts 64, 66 and connectors 68, 70 provide a reliable electrical connection between the modular battery 56 and the motor 22, while allowing relatively easy attachment and detachment of the modular battery 56 from the vehicle 12.

Power from the modular battery 56 is selectively provided to the motor 22 by way of a first contactor 72. The first contactor 72 includes an actuator 74 and first and second switches 76, 78. The first and second switches 76, 78 are selectively opened and closed by the actuator 74. The actuator 74 is responsive to commands from the control system 58. While two switches 76, 78 are shown, there could be a single switch in some examples.

In this example, a DC-to-DC converter 80 is provided between the first contactor 72 and the motor 22. The DC-to-DC converter 80 converts direct current from the modular battery 56 from one voltage level to another. In this example, the relatively low voltage provided by the modular battery 56 is converted to a voltage that is relatively high, and capable of powering the vehicle 12. In one example, the modular battery 56 provides a voltage of 60 Volts (DC) which is converted by the DC-to-DC converter to 350 Volts (DC). Further, a DC-to-AC inverter 82 changes the direct current from the modular battery 56 to alternating current, and provides the alternating current to the motor 22.

In a non-limiting embodiment, the DC-to-DC converter 80 is capable of providing a variable voltage output, which can be controlled by the control system 58. In a further example, the output voltage of the DC-to-DC converter 80 can be controlled to match the voltage of the vehicle-mounted battery 24, so that both batteries can concurrently provide power to the motor 22. In another example, the output voltage of the DC-to-DC converter 80 can be controlled to be slightly above the voltage of the vehicle-mounted battery 24, so that electrical energy will flow from the modular battery 56 to the vehicle-mounted battery 24. This mode can be used, when (1) the state of charge (or, "S.O.C.") of the vehicle-mounted battery 24 is relatively low and (2) the power demand from the motor 22 is low. One benefit of charging the vehicle-mounted battery 24 from the modular battery 56 is that depletion of the modular battery 56 can be balanced out over a drive cycle, which will increase the percentage of pure electric driving over the drive cycle.

Figure 6:
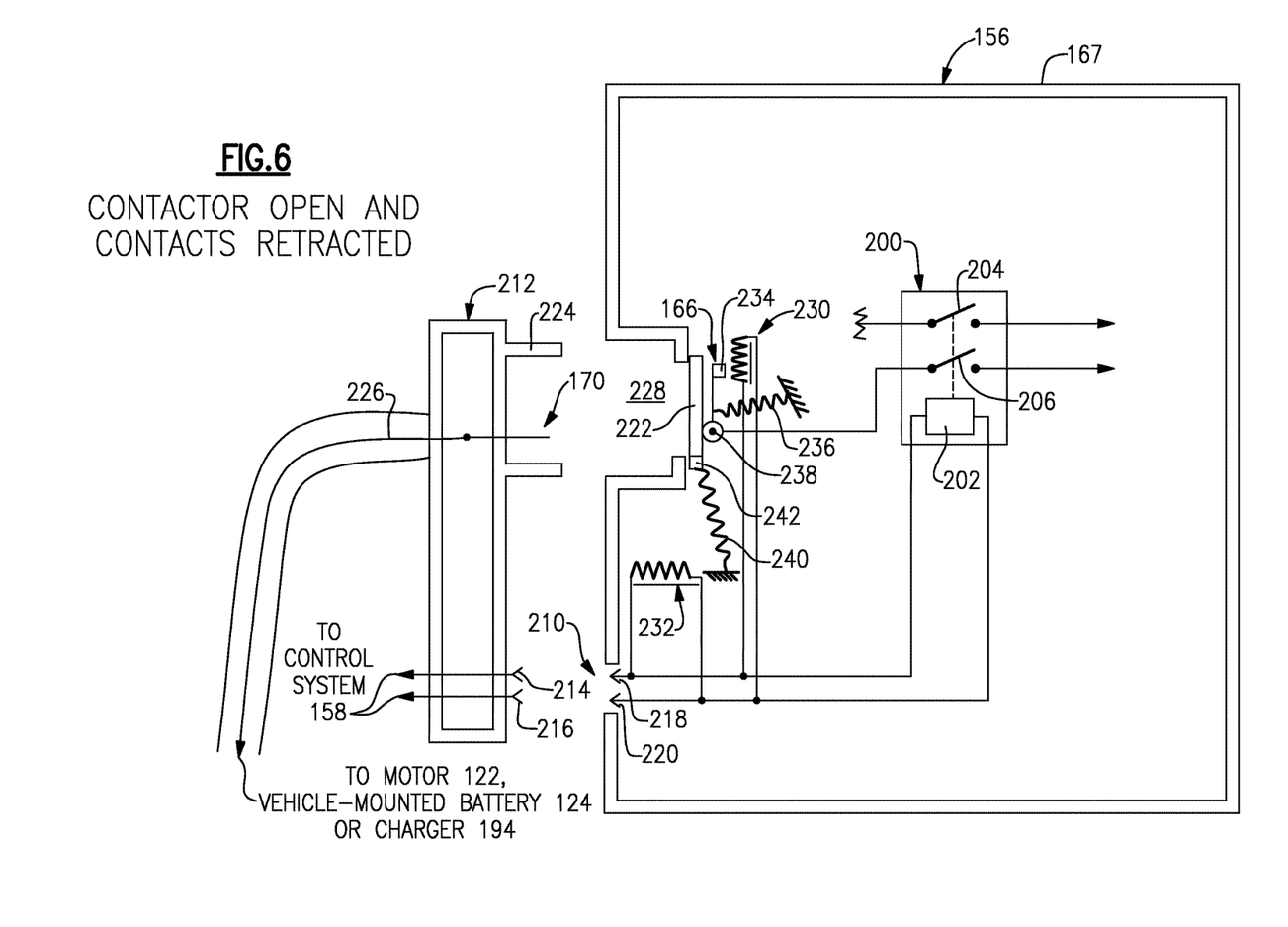

The vehicle 12 includes a second contactor 84 between the vehicle-mounted battery 24 and the motor 22. The second contactor 84 includes an actuator 86 and first and second switches 88, 90, which are selectively opened and closed by the actuator 86. The actuator 86 is responsive to commands from the control system 58. The control system 58 is configured to provide instructions to the contactors 72, 84 to selectively provide power to the motor 22 from the modular battery 56, the vehicle-mounted battery 24, or a combination of the two. One example control scheme is shown in FIG. 6 and described below.

As mentioned, the modular battery 56 is designed to be routinely removed from the vehicle and charged at a remote location. In this example, the modular battery 56 includes a handle, which in this example includes one or more flexible straps 92 that allow a user U (see FIG. 3A) to transport the modular battery 56 from the vehicle 12 to a remote location. The straps 92 allow the user to carry the modular battery 56 in the style of a duffel bag (i.e., an over-the-shoulder strap), a hand bag (i.e., a wrist strap or straps), or a backpack (i.e., two shoulder straps), as examples. In other words, not only can the user carry the modular battery 56, but the modular battery 56 may also be "wearable" (i.e., in the backpack example). The handle does not require a flexible strap in all examples, and could be provided by a retractable handle stored within the exterior housing 67 of the modular battery 56 when not in use, similar to handles used with rolling luggage. The modular battery 56 in this example is relatively light, and is on the order of about 5 kilograms (about 11 pounds). Thus, the modular battery 56 can be easily transported by the user U.

Figure 3A:
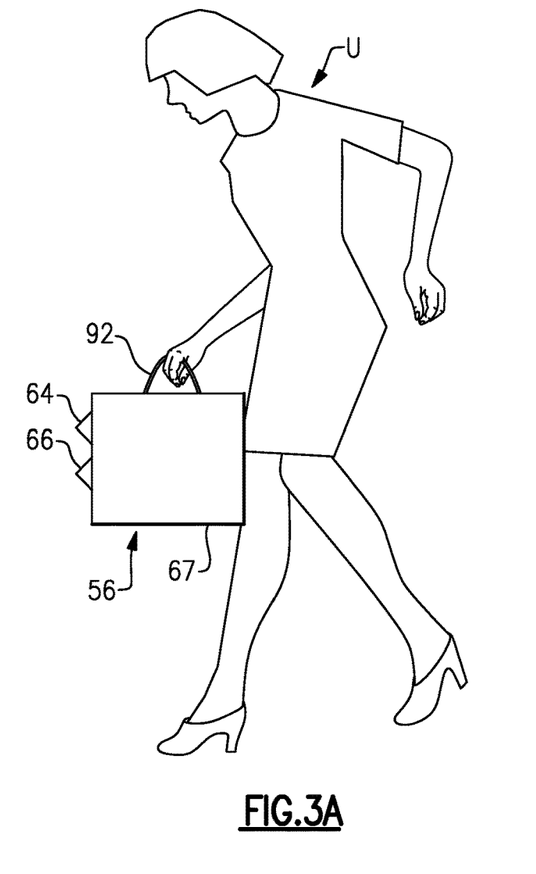
FIG. 3A illustrates a user carrying the first example modular battery.

In FIG. 3A, a user U has removed the modular battery from the vehicle 12 by disconnecting the first and second contacts 64, 66 from the first and second connectors 68, 70, and is carrying the modular battery 56 using the strap 92. In this example, the strap 92 is wrist strap.

Figure 3B:
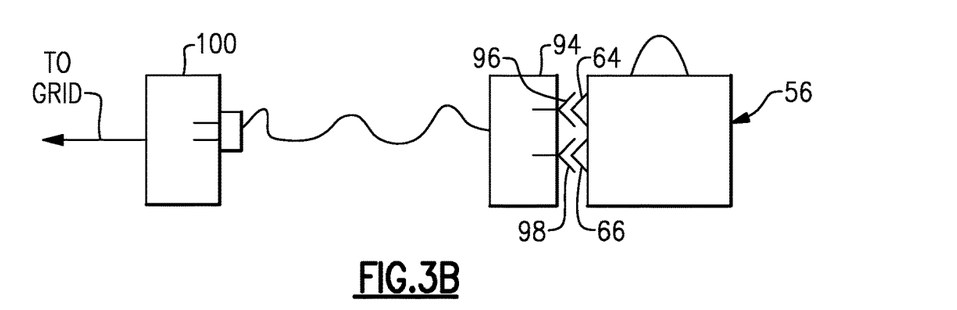
FIG. 3B illustrates the first example modular battery being charged.

In FIG. 3B, the modular battery 56 is connected to a charger 94, which is electrically coupled to an electrical grid via an outlet 100. In North America, for example, the outlet 100 may be a typical 120 Volt (AC) outlet. The charger 94 may be provided at a user's home or office, and is configured to convert the alternating current from the outlet 100 to direct current to charge the modular battery 56. The charger 94 includes first and second connectors 96, 98 for receiving the first and second contacts 64, 66. The first and second connectors 96, 98 may be any known type of connector, and may be similar to the connectors 68, 70 in one example.

Figure 4:
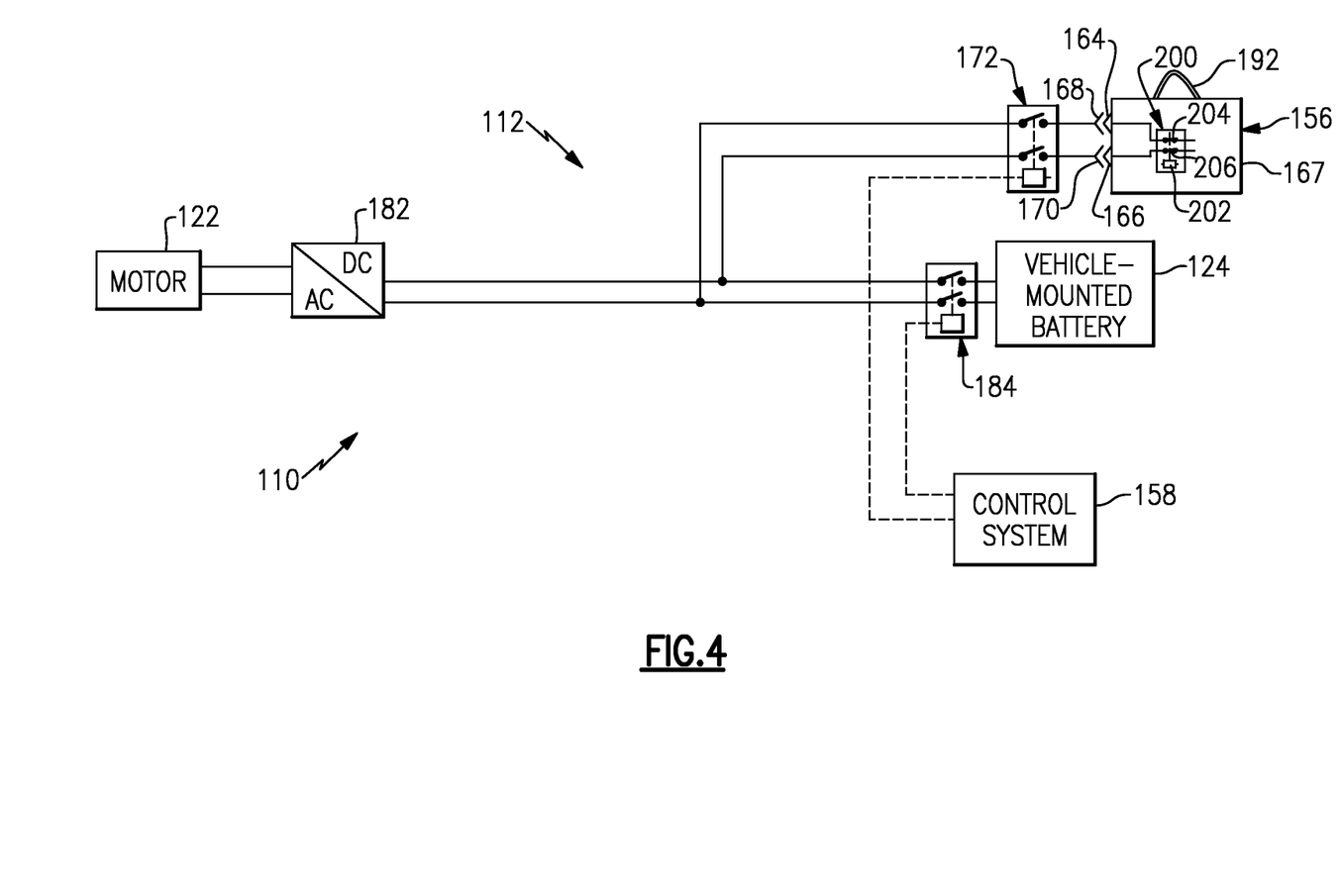

FIG. 4 illustrates a portion of a second example powertrain 110. To the extent not otherwise described or shown, the powertrain 110 of FIG. 4 corresponds to the powertrain 110 of FIGS. 1-2, with like parts having reference numerals preappended with a "1." FIG. 4 schematically illustrates a second example connection between the modular battery 156, the vehicle mounted battery 124, and the motor 122.

In this example, the modular battery 156 is a relatively high voltage battery. In one non-limiting example, the modular battery 156 provides a voltage of about 350 Volts (DC), which may be substantially equal to the voltage provided by the vehicle-mounted battery 124. The vehicle-mounted battery 124 could provide a voltage (sometimes called a "nominal voltage") within a range of about 250-1,000 Volts (DC) in some examples. Regardless of the voltage of the vehicle-mounted battery 124, the voltages provided by the two batteries 124, 156 would be substantially equal in this example. Since the voltage of the modular battery 156 is already substantially high, there is no DC-to-DC converter (such as the DC-to-DC converter 80 in FIG. 2) between the modular battery 156 and the motor 122.

Figure 5A:
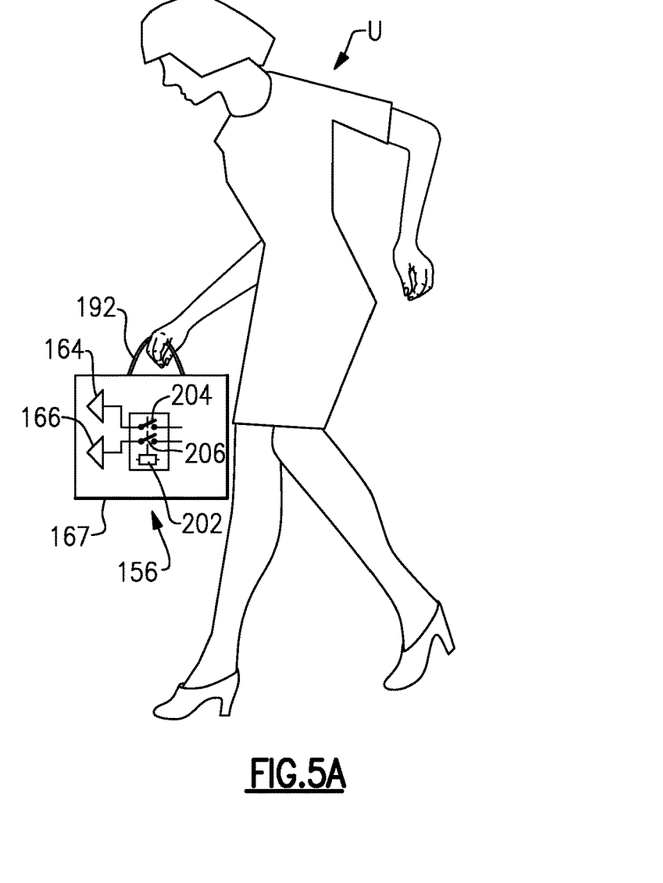
FIG. 5A illustrates a user carrying the second example modular battery.
Figure 5B:
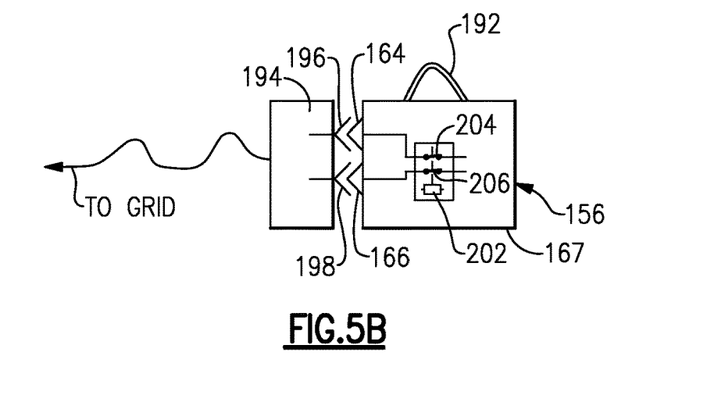
FIG. 5B illustrates the second example modular battery being charged.

Further, in this example, the modular battery 156 includes an internal contactor 200. The internal contactor 200 includes an actuator 202 and first and second switches 204, 206. The first and second switches 204, 206 are electrically coupled to first and second contacts 164, 166. When the modular battery 156 is connected to the vehicle 112 (as shown in FIG. 4) or a charger (as shown in FIG. 5B), the switches 204, 206 will close, allowing electricity to flow to the contacts 164, 166. When removed from the vehicle 112 (as shown in FIG. 5A), the switches will open, which prevents electricity from flowing to the contacts 164, 166.

Further, in this example, the first and second contacts 164, 166 are retractable within an exterior housing 167 of the modular battery 156. As shown in FIG. 5A, when the first and second contacts 164, 166 are detached from the connectors 168, 170, the first and second contacts 164, 166 retract within the exterior housing 167 of the battery 156. The modular battery 156 may include a mechanism configured to selectively retract the contacts 164, 166 when away from the vehicle 112 or a charger 194 (FIG. 5B). This disclosure extends to all types of retraction mechanisms.

Figure 7:
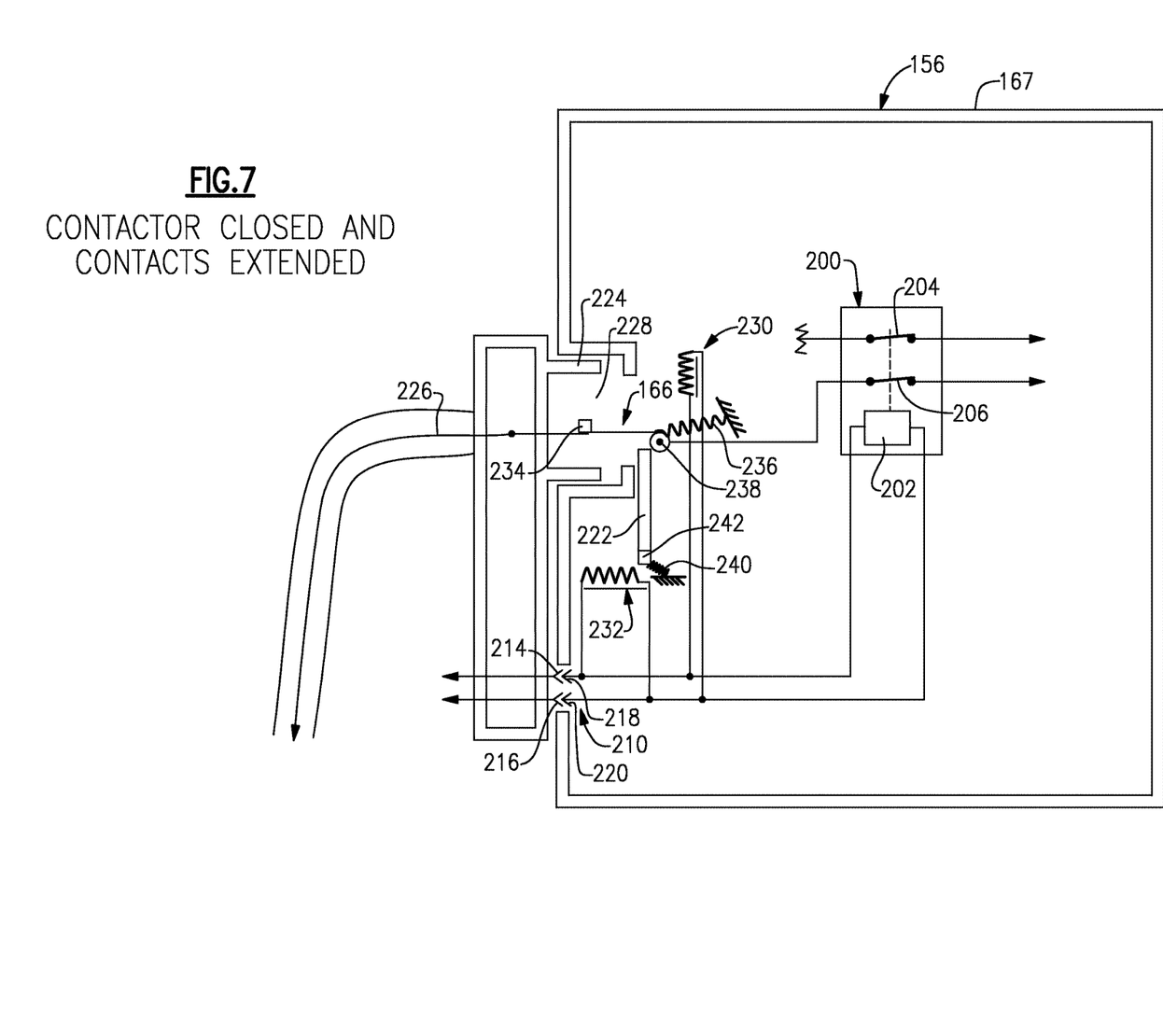

FIGS. 6-7 illustrate one exemplary embodiment of a retraction mechanism. FIGS. 6-7 illustrate the example retraction mechanism relative to one contact 166 only. It should be understood that the modular battery 156 would be arranged similarly relative to the remaining contact 164.

In this embodiment, the modular battery 156 has an electrical connection 210, electrically coupled to the actuator 202 of the contactor 200. The modular battery 156 is connected to the vehicle 112, or a charger 194, via a connector having a housing 212. The housing 212 has first and second connectors 214, 216 configured to couple to first and second actuator contacts 218, 220. The actuator contacts 218, 220 couple the actuator 202 to the control system 158 via the actuator connectors 214, 216.

In this example, in FIG. 6, the contact 166 is within the exterior housing 167 of the modular battery 156. The exterior housing 167 of the modular battery 156 in this example includes a moveable door 222 configured to selectively move to expose a window for the contact 166 to project through. In this example, the door 222 only opens, and the contact 166 only projects through the door 222, when the electrical connection 210 is established between the control system 158 and the actuator 202 (via the actuator connectors 214, 216 and the actuator contacts 218, 220). The housing 212 is arranged such that, when the electrical connection 210 (again, between the control system 158 and the actuator 202) is established, a plug 224 enclosing an electrical connection 226 is received in a socket 228 adjacent the door 222.

When the connection 210 is not energized, the contactor 200 will be open (FIG. 6), and magnets 230, 232 will be de-energized. In this example, the magnet 230 is a coil magnet and is configured to generate a repulsive force when energized. The magnet 232 is also a coil magnet in this example, and is configured to generate an attractive force when energized.

The contact 166 includes a magnetic element 234 and is biased to a retracted position (within the housing 167) by a spring 236. The contact 166 in this example is configured to rotate about a pivot point 238. Also, another spring 240 biases the door 222 to a closed position (FIG. 6).

When the electrical connection 210 is established, the vehicle control system 158 (or, a control system associated with the charger 194) will instruct the contactor 200 to close (FIG. 7), which will energize magnets 230, 232. Magnet 230 will repel the magnetic element 234 of the contact 166, and magnet 232 will attract a magnetic element 242 of the door 222. With the door 222 open and exposing a window leading to the socket 228, the contact 166 rotates into engagement with the electrical connection 226, which ultimately electrically couples the modular battery 156 to the vehicle 112 (or, the charger 194).

Figure 8:
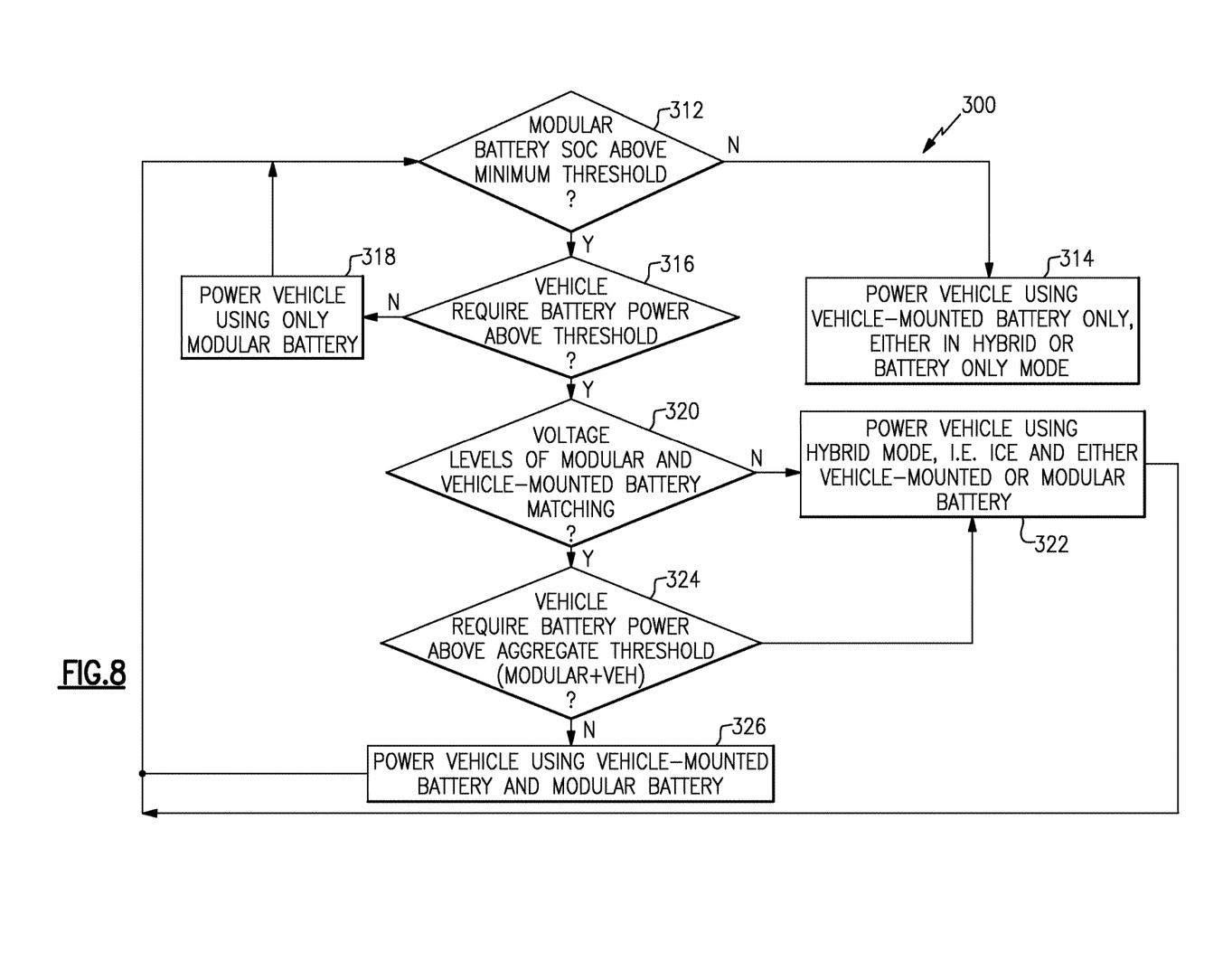
FIG. 8 is a flow chart illustrating a first example method.
Figure 9:
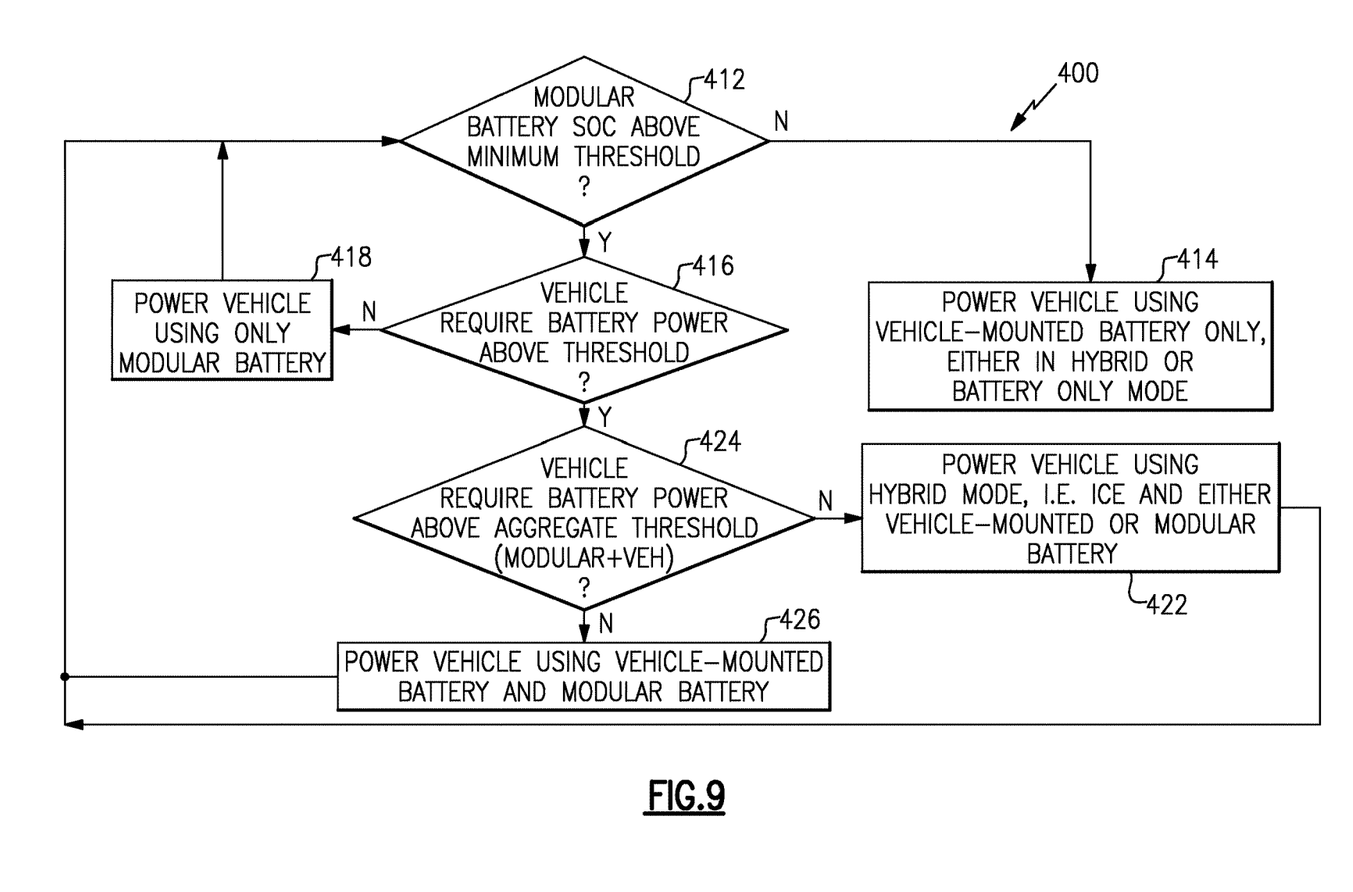
FIG. 9 is a flow chart illustrating a second example method.

FIGS. 8-9 illustrate example methods according to this disclosure. In general, the vehicle 12 will deplete the modular battery 56 before drawing power from the vehicle-mounted battery 24. For short trips, such as between a home and an office, the vehicle 12 may be powered entirely by the modular battery 56. For longer trips, the vehicle 12 may turn to the vehicle-mounted battery 24 for electrical power once the modular battery 56 is depleted.

In the method 300 of FIG. 8, at 312, the control system 58 determines whether the modular battery 56 has an S.O.C. above a minimum threshold. In one example, the minimum state of charge threshold is a predetermined value of 15%. In that example, the vehicle 12 will, at 314, draw power from only the vehicle-mounted battery 24 when the modular battery 56 has a state of charge at or below 15%. With reference to the FIG. 2 embodiment, the control system 58, at 314, will instruct the first contactor 72 to open and the second contactor 84 to close.

If the modular battery 56 has an S.O.C. above the minimum S.O.C. threshold, the control system 58 will then determine, at 316, whether the modular battery 56 alone can provide enough power for the vehicle 12. In one example, the control system 58 determines whether the power requested by the vehicle 12 exceeds a predetermined power threshold of the modular battery 56, above which the modular battery 56 cannot sufficiently power the vehicle 12. If the vehicle 12 does not require excess power, the vehicle 12 is powered using only the modular battery 56, at 318. At 318, the control system 58 instructs the first contactor 72 to close and the second contactor 84 to open.

If the vehicle 12 does require excess power, the vehicle 12 may be powered using both the vehicle-mounted battery 24 and the modular battery 56. In one example, at 320, the control system 58 determines whether the voltage levels of the modular and vehicle mounted batteries 56, 24 match. Since the vehicle-mounted battery 24 and the modular battery 56 are connected in parallel, there may be a requirement of a voltage match between the two batteries in order to power the vehicle 12 using both batteries simultaneously. If there is no match, the vehicle 12 will be powered in an ordinary hybrid mode, for example, at 322. If there is a match, the control system 58 then determines at 324 whether the vehicle 12 requires more power than the batteries 24, 56 can collectively provide. If so, the vehicle 12 is powered in hybrid mode at 322. If not, the vehicle 12 is powered using both the vehicle-mounted battery 24 and the modular battery 56, at 326.

FIG. 9 discloses a method 400 which is similar to the method 300 of FIG. 8. The method 400 includes corresponding steps, which correspond to those in the method 300, with numbers preappended with a "4" instead of a "3." The method 400 may be used in the example where the vehicle 12 has a DC-to-DC converter which provides a variable, controllable power output. Thus, in the method 400, the voltage matching step 320 is not required.

By depleting the modular battery 56 first, the vehicle-mounted battery 24 is saved from additional charging and discharging cycles, which improves the life of the vehicle-mounted battery 24. Further, by depleting the state of charge to a relatively low value (e.g., 15%), the life of the modular battery 56 is not adversely affected by the method 210.

Figure 10:
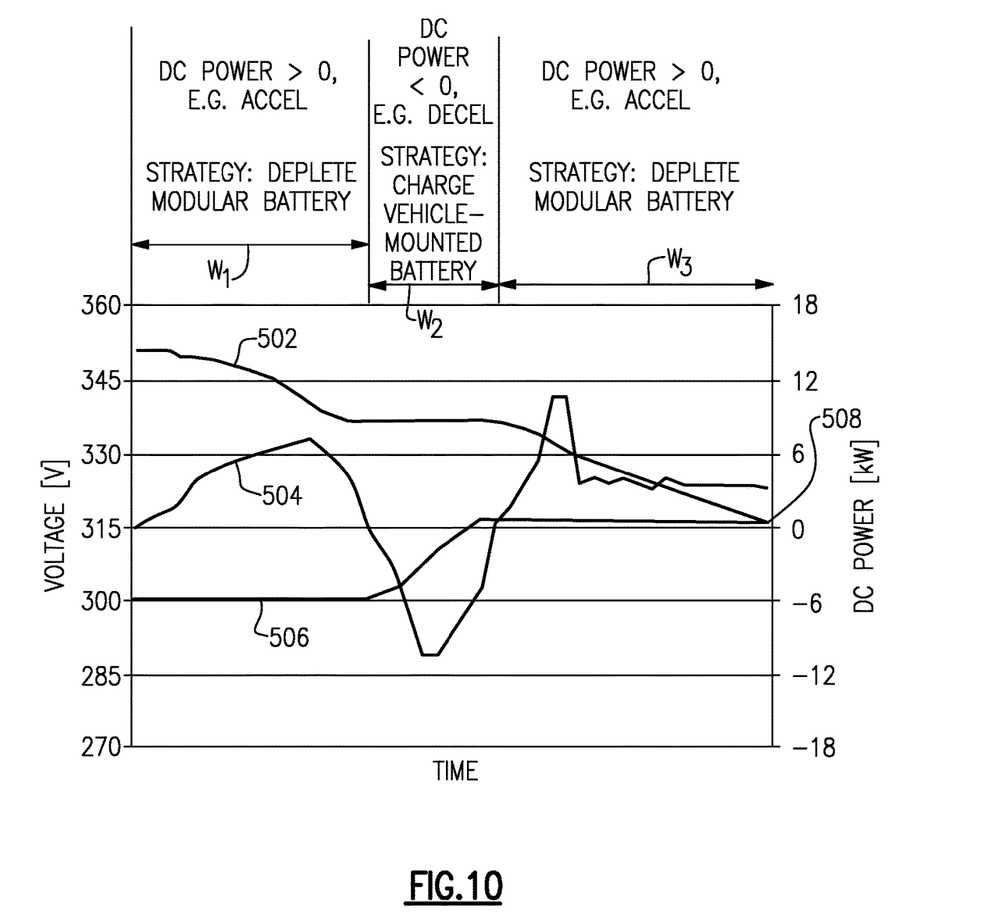
FIG. 10 is a graphical representation of an example control strategy.

FIG. 10 illustrates an example graphical representation of voltage and power versus time for three separate windows of time $W_1$-$W_3$. In the first window of time $W_1$, the modular battery 56 begins with a full charge (voltage represented at line 502). Within $W_1$, the control system 58 determines, in one example, that the power required by the vehicle (represented at line 504) is greater than 0 (zero) (i.e., the vehicle 12 is accelerating), and thus the control system 58 depletes the modular battery 56 (such as at step 318). Within the second time window $W_2$, the vehicle 12 is decelerating, and the power required by the vehicle 12 is negative. In this window $W_2$, the control system 58 charges the vehicle-mounted battery 24 (voltage represented at line 506), and does not deplete the modular battery 56. Within window $W_3$, the modular battery 56 is depleted as the power required of the vehicle (line 504) is again positive. At point 508, the voltages of the modular battery 56 and vehicle-mounted battery 24 are equal. At this point, power could be provided from both batteries (such as in step 326). FIG. 10 is exemplary, and should not be considered limiting.

The system and method of this disclosure provides users with the ability to extend the range of their vehicles by charging the modular battery at home, in an office, or at any other location remote from the vehicle. The modular battery can be charged in a relatively convenient manner, and extends vehicle range by reducing reliance on other power sources such as vehicle-mounted batteries and/or an internal combustion engines.

It should be understood that such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a vehicle-mounted battery; and
a modular battery selectively removable from the vehicle, the modular battery configured to be charged at a location remote from the vehicle, wherein the vehicle is selectively powered and driven by at least one of the modular battery and the vehicle-mounted battery, wherein the modular battery is a lower voltage battery than the vehicle-mounted battery.

2. The vehicle as recited in claim 1, wherein a DC-to-DC converter is provided between the modular battery and an electric machine, the DC-to-DC converter configured to increase the voltage provided by the modular battery and supply the increased voltage to the electric machine.

3. The vehicle as recited in claim 1, wherein the modular battery is connected to an electric machine by way of a contactor, the contactor being separate from the modular battery.

4. The vehicle as recited in claim 1, wherein the modular battery provides a voltage of about 60 Volts DC.

5. The vehicle as recited in claim 4, wherein the modular battery includes a contactor.

6. The vehicle as recited in claim 5, wherein the modular battery further includes a plurality of retractable contacts, the contacts configured to selectively (1) project from an exterior of the modular battery when the contactor is closed, and (2) retract into the interior of the modular battery when the contactor is open.

7. The vehicle as recited in claim 1, wherein the modular battery weighs about 5 kilograms.

8. The vehicle as recited in claim 1, wherein the vehicle is powered by only the modular battery until the charge of the modular battery reaches a minimum state of charge threshold, and wherein the vehicle is powered by only the vehicle-mounted battery when the charge of the modular battery reaches minimum state of charge threshold.

9. The vehicle as recited in claim 8, wherein the minimum state of charge threshold is 15%.

10. The vehicle as recited in claim 1, wherein the vehicle is powered by both the modular battery and the vehicle-mounted battery until the charge of the modular battery reaches a minimum state of charge threshold, and wherein the vehicle is powered by only the vehicle-mounted battery when the charge of the modular battery reaches the minimum state of charge threshold.

11. The vehicle as recited in claim 1, wherein the modular battery includes at least one strap to allow a user to transport the modular battery.

12. The vehicle as recited in claim 1, wherein the modular battery and the vehicle-mounted battery are connected to an electric machine in parallel with one another, the electric machine configured to drive wheels of the vehicle.

13. A method, comprising:
powering a vehicle by selectively drawing power from at least one of a vehicle-mounted battery and a modular battery, the modular battery configured to be charged at a location remote from the vehicle, wherein the modular battery is a lower voltage battery than the vehicle-mounted battery; and
powering the vehicle by both the modular battery and the vehicle-mounted battery until the charge of the modular battery reaches a minimum state of charge threshold.

14. The method as recited in claim 13, comprising:
powering the vehicle by only the vehicle-mounted battery when the charge of the modular battery reaches the minimum state of charge threshold.

15. A method, comprising:
powering a vehicle by selectively drawing power from at least one of a vehicle-mounted battery and a modular battery, the modular battery configured to be charged at a location remote from the vehicle;

powering the vehicle by both the modular battery and the vehicle-mounted battery until the charge of the modular battery reaches a minimum state of charge threshold;

retracting contacts of the modular battery within an exterior housing of the modular battery when a contactor of the modular battery is open; and projecting the contacts of the modular battery outside the exterior housing when the contactor is closed.

16. The method as recited in claim 13, comprising:

charging the modular battery at a location remote from the vehicle.

\* \* \* \* \*